United States Patent
Miki

(10) Patent No.: US 7,454,533 B2
(45) Date of Patent: Nov. 18, 2008

(54) REDUNDANT PATH CONTROL APPARATUS AND REDUNDANT PATH CONTROL METHOD

(75) Inventor: Kenichi Miki, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 11/049,886

(22) Filed: Feb. 4, 2005

(65) Prior Publication Data

US 2005/0193228 A1    Sep. 1, 2005

(30) Foreign Application Priority Data

Feb. 6, 2004    (JP) .............................. 2004-030871

(51) Int. Cl.
*G06F 3/00* (2006.01)
(52) U.S. Cl. .............................. 710/38; 710/62; 710/74; 714/5; 714/12
(58) Field of Classification Search .................. None
See application file for complete search history.

(56) References Cited

U.S. PATENT DOCUMENTS

| | | | |
|---|---|---|---|
| 6,601,128 B1 | 7/2003 | Burton et al. | |
| 7,103,504 B1 * | 9/2006 | McGlaughlin et al. | ...... 702/182 |
| 7,228,538 B1 * | 6/2007 | Burton et al. | ............... 717/170 |
| 2003/0233502 A1 * | 12/2003 | Murotani et al. | .............. 710/74 |

FOREIGN PATENT DOCUMENTS

| | | |
|---|---|---|
| JP | 02-302860 | 12/1990 |
| JP | 03-105540 | 5/1991 |
| JP | 04-081960 | 3/1992 |
| JP | 09-016502 | 1/1997 |
| JP | 11-298475 | 10/1999 |
| JP | 2000-284982 A | 1/2000 |
| JP | 2002-023963 A | 1/2002 |
| JP | 2002-304331 | 10/2002 |

OTHER PUBLICATIONS

Meador, Wes E., Disk Array Systems, 1989, Maximum Strategy, Inc., San Jose, CA, pp. 143-146.*

* cited by examiner

*Primary Examiner*—Eron J Sorrell
(74) *Attorney, Agent, or Firm*—Foley & Lardner LLP

(57) ABSTRACT

A host computer is connected to logical disks via controllers, and accesses the logical disks. When maintenance work is performed on a first controller, information indicating that the first controller is undergoing maintenance work is stored in the other controllers. When an access is made to a logical disk designating a path including the first controller, a redundancy driver of the host computer can discriminate the cause for an access failure based on the information stored in the other controllers even if the access fails.

6 Claims, 13 Drawing Sheets

| PORT NUMBER | WORLD WIDE PORT NAME | PORT STATUS |
|---|---|---|
| 1 | aaaaaaaaaaaaa | NORMAL |
| 2 | bbbbbbbbbbbbb | FIRMWARE REPLACEMENT START COMMAND STANDBY |
| 3 | ccccccccccccc | FIRMWARE REPLACEMENT IN PROGRESS |
| ⋮ | | |
| n | nnnnnnnnnnnnn | FIRMWARE REPLACEMENT FAILURE |

FIG.5

REDUNDANT PATH CONTROL APPARATUS AND REDUNDANT PATH CONTROL METHOD

BACKGROUND OF THE INVENTION

1. Field of the Invention

The present invention relates to a redundant path control apparatus which has logical disks, redundantly has paths to access the logical disks and provides a host computer with memory areas of the logical disks by adequately switching the paths, and a redundant path control method.

2. Description of the Related Art

A disk army system which can use a plurality of hard disk units as if they were a single hard disk unit is disclosed in, for example, Unexamined Japanese Patent Application KOKAI Publication No. 2002-304331. A host computer which constitutes the disk array system accesses data stored in logical disks constructed by a plurality of hard disk units. The access is carried out according to application software that is executed by the host computer.

The disk array system has plural paths to access individual logical disks, and controllers respectively associated with the paths. This can allow, for example, the host computer to make a fast access to the logical disks. Even when any path fails, data can be sent again using another path. That is, retry is possible using another path.

Further, the disk array system is capable of forcibly releasing a reserve state, when there is a logical disk which is in a state seized by a specific unit (reserved state), and switching the logical disk into a state seized by the host computer. Even when a retry process is terminated abnormally due to the seizure of the target logical disk by a specific device, therefore, the retry process can be executed again and successfully.

When maintenance work is performed on a controller in this disk array system, specifically, when the package of a controller or the firmware of a controller is to be replaced, maintenance work is carried out according to one of the following three schemes (1) to (3) in order to prevent input/output accesses to the controller targeted for maintenance work.

(1) Maintenance work is performed after all the accesses to the disk array from the host computer are stopped.

(2) Over a given period of time in which maintenance work on a controller is completed, the controller is unresponsive to an I/O access from the host computer according to application software. When the controller becomes unresponsive, the host computer decides that some kind of fault has occurred in a path to access the logical disk that has been used so far, and resumes the access by switching the path to an adequate one. This cancels an access to the controller targeted for maintenance work.

(3) Maintenance work is performed after the host computer changes a path to access the target logical disk as a consequence of a manual operation performed on the host computer.

The schemes (1) to (3) face the following problems.

The scheme (1) stops every access to the disk array from the host computer. This essentially requires that the process of the application software running on the host computer should be terminated.

According to the scheme (2), the controller that is undergoing maintenance work does not respond to an input/output request from the host computer, so that an access by the host computer would fail. However, a retry process using a substitute path (i.e., another controller) is performed. It is therefore unnecessary to terminate the process of application software. The host computer cannot however discriminate whether the cause for the access failure is originated from a fault in the path or the controller undergoing maintenance work, and treats both cases as having originated from a fault in the path. When the cause for an access failure cannot be discriminated, maintenance work is likely to be in confusion.

According to the scheme (3), a path to access a logical disk is manually changed beforehand so that an access request to the target controller for maintenance work will not be generated (i.e., the path is changed in such a way as to go through a controller which is not targeted for maintenance work). When the number of host computers to be connected to the disk array system and/or the number of paths to be connected to each host computer becomes larger, the content of the manual operation becomes complicated, increasing a possible risk of erroneously switching the path.

SUMMARY OF THE INVENTION

Accordingly, it is an object of the present invention to provide a redundant path control apparatus and a redundant path control method which can allow a host computer to predict the cause for an access failure without terminating the process of the host computer.

To achieve the object, according to the first aspect of the invention, there is provided a redundant path control apparatus comprising:

a host computer; and a plurality of controllers connected to the host computer and an external memory device and mediates accesses of the host computer to the memory device through communication with the host computer, routes from the host computer to the controllers forming a plurality of paths different from one another, wherein each of the controllers acquires status information indicative of a status of a path including other controllers, stores the status information, and supplies the host computer with the status information in response to a request sent from the host computer, and the host computer designates one of the plurality of paths based on the status information and accesses the memory device via the designated path.

The status information may include information indicating a controller targeted for maintenance work.

When an access to the memory device has failed, the host computer may supply the request to that controller which forms a path other than a path used for the access, and acquire the status information from the controller, may predict based on the acquired status information whether or not failure of the access has occurred because that controller which forms the path used for the access has been a target for maintenance work, and may designate a path different from the path used for the access and access the memory device via the designated path upon prediction that failure of the access has occurred because that controller which forms the path used for the access has been a target for maintenance work.

The host computer may periodically specify controller targeted for maintenance work based on the status information acquired by periodically supplying the request to an arbitrary one of the controllers.

The apparatus may include a plurality of host computers.

According to the second aspect of the invention, there is provided a redundant path control method for allowing a host computer to select a path to be used for an access to an external memory device in a system comprising the host computer, and a plurality of controllers connected to the host computer and the external memory device and mediates accesses of the host computer to the memory device through communication with the host computer, routes from the host computer to the controllers forming a plurality of paths different from one another, wherein each of the controllers acquires status information indicative of a status of a path including other controllers, stores the status information, and supplies the host computer with the status information in response to a request sent from the host computer, and the host computer designates one of the plurality of paths based on the status information and accesses the memory device via the designated path.

According to the method, the status information may include information indicating a controller targeted for maintenance work.

BRIEF DESCRIPTION OF THE DRAWINGS

These objects and other objects and advantages of the present invention will become more apparent upon reading of the following detailed description and the accompanying drawings in which;

FIG. 5 is a diagram illustrating information given to the host computer by a controller;

DETAILED DESCRIPTION OF THE PREFERRED EMBODIMENT

Figure 1:
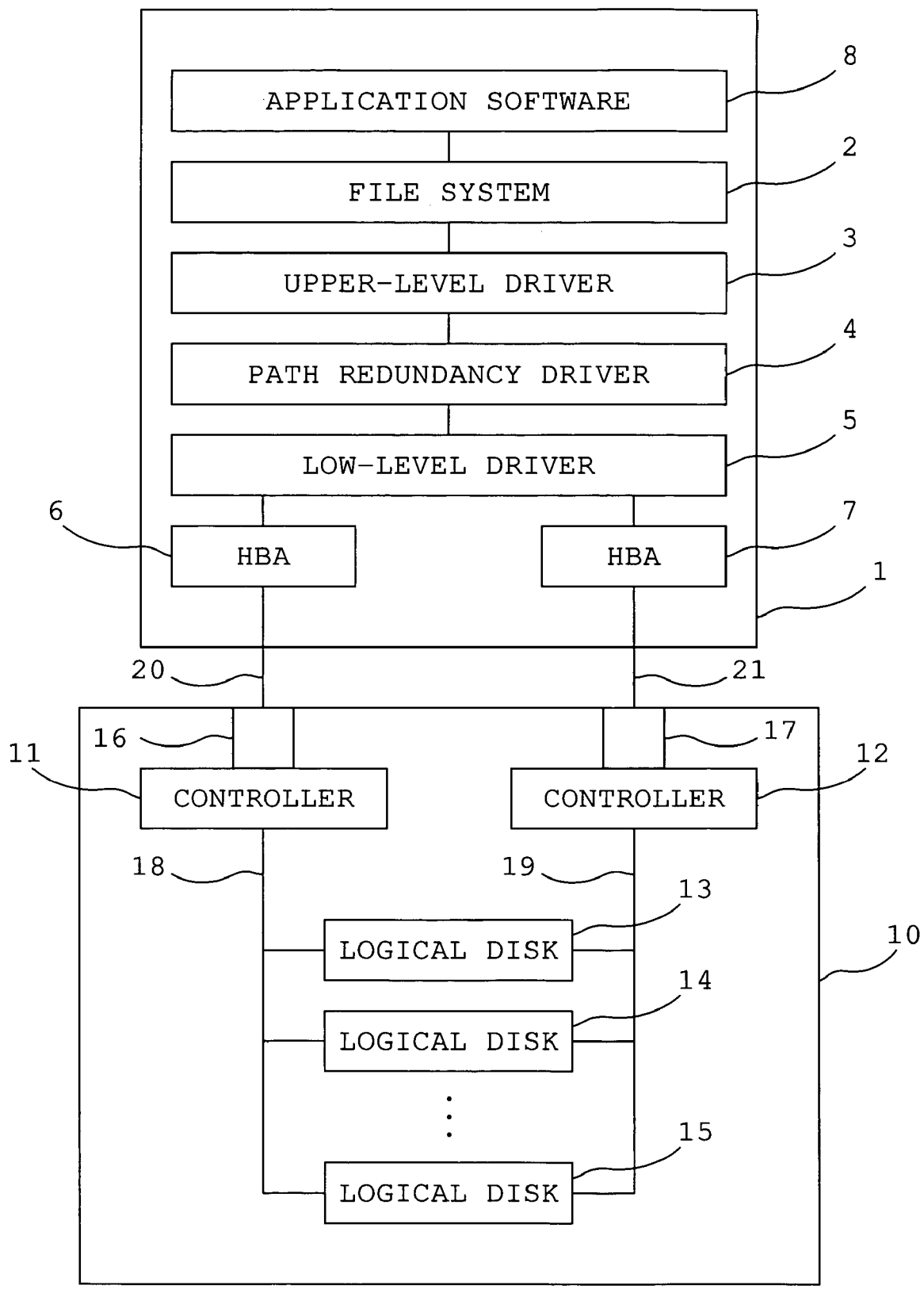
FIG. 1 is a diagram showing the architectures of a host computer and a disk array system according to an embodiment of the present invention.

A preferred embodiment of the invention will be described below with reference to the accompanying drawings. FIG. 1 is a diagram showing the architectures of a host computer 1 and a disk array system 10 according to the embodiment of the invention.

The host computer 1 comprises a processor, a memory and an interface circuit, and the like. As illustrated, the host computer 1 includes a file system 2, an upper-level driver 3, a path redundancy driver 4, a low-level driver 5, HBAs (Host Bus Adapters) 6 and 7 to be initiators, and executes application software 8. Those components should not necessarily be constituted by separate hardware. For example, a single processor may execute a program which provides the functions of the file system 2, the upper-level driver 3, the path redundancy driver 4, the low-level driver 5 and HBAs 6 and 7 as layers in addition of executing the application software 8.

As illustrated, the disk array system 10 includes a plurality of logical disks, and further redundantly includes paths to access the logical disks. The disk array system 10 provides the host computer 1 with memory areas of the logical disks by adequately switching the paths.

Specifically, the disk array system 10 has, for example, two controllers 11 and 12, and logical disks 13, 14 and 15 each comprised of an arbitrary number of hard disks. Each of the controllers 11 and 12 comprises a processor, a memory and an interface circuit, and the like. The controller 11 has a host connection port (port) 16 to acquire data and commands from the host computer 1. Likewise, the controller 12 has a host connection port (port) 17. The controller 11 is connected to the logical disks 13, 14 and 15 via an internal bus 18. The controller 12 is connected to the logical disks 13, 14 and 15 via an internal bus 19. A route from the host computer 1 to the logical disks 13, 14 and 15 through the controller 11, and a route from the host computer 1 to the logical disks 13, 14 and 15 through the controller 12 constitute separate paths.

The HBA 6 is connected to the host connection port 16 by a host interface cable 20. The HBA 7 is connected to the host connection port 17 by a host interface cable 21.

The host computer 1 generates commands to be given to the disk array system 10. The host computer 1 accesses the logical disks 13, 14 and 15. Specifically, the host computer 1 supplies data to the logical disk 13, 14 or 15 and acquires data from the logical disks 13, 14 and 15.

The low-level driver 5 executes data input and output via the HBA 6 or 7 by controlling the HBA 6 or 7.

The path redundancy driver 4 receives a command and data from the upper-level driver 3 and gives them to the low-level driver 5. The path redundancy driver 4 receives information indicative of the result of an access to the logical disks 13, 14 and 15 of the disk array system 10 via the HBA 6 or 7 and the low-level driver 5. Based on the information and the like, the path redundancy driver 4 determines if the access has been terminated normally or abnormally, and also determines the cause for abnormal termination. When having decided that the cause for abnormal termination is a fault or a failure occurred in the components of the path (e.g., the HBAs 6 and 7, the host interface cables 20 and 21, the controllers 11 and 12, etc.), the path redundancy driver 4 retries the access, terminated abnormally, by using a substitute path.

The controller 11 of the disk away system 10 is connected to the logical disks 13, 14 and 15 via the internal bus 18. The controller 12 is connected to the logical disks 13, 14 and 15 via the internal bus 19. Both of the controllers 11 and 12 can therefore access the individual logical disks 13, 14 and 15.

Data which is written in the disk array system 10 is sent to the controller 11 via the file system 2, the upper-level driver 3, the path redundancy driver 4, the low-level driver 5, and, for example, the HBA 6, the host interface cable 20 and the host connection port 16 by the host computer 1, and is written in the logical disk 13, 14 or 15 whichever designated by the controller 11.

Data read from the disk array system 10 is sent from the logical disk 13, 14 or 15 whichever designated by the controller 11 to, for example, the HBA 6 via the controller 11, the host connection port 16 and the host interface cable 20, and is further given via the low-level driver 5, the path redundancy driver 4, the upper-level driver 3 and the file system 2 to the application software 8 that is executed by the host computer 1.

Generally, the result of executing data input/output by the host computer 1 is determined by the individual layers of the HBA 6, the low-level driver 5, the path redundancy driver 4, the upper-level driver 3, the file system 2 and the application software 8, and an adequate process according to the need is carried out.

Of the components, the path redundancy driver 4 determines if an access has been terminated normally or abnormally based on information or so received from the low-level driver 5 as mentioned above. When having decided that the cause for abnormal termination is a fault or a failure occurred in the components of the path, the path redundancy driver 4 retries the access terminated abnormally by using a substitute path.

Further, to prevent data input/output from being concentrated only on one path, the path redundancy driver 4 effectively uses the other path to distribute the input/output loads by distributing the data input/output process to the controller 11 or 12.

The following will describe, as one example of maintenance work, a case of doing a work to replace firmware stored in the controller 11 or 12 of the disk array system 10.

To begin with, the operation of the disk array system 10 will be discussed referring to FIGS. 2A to 5.

Figure 2A:
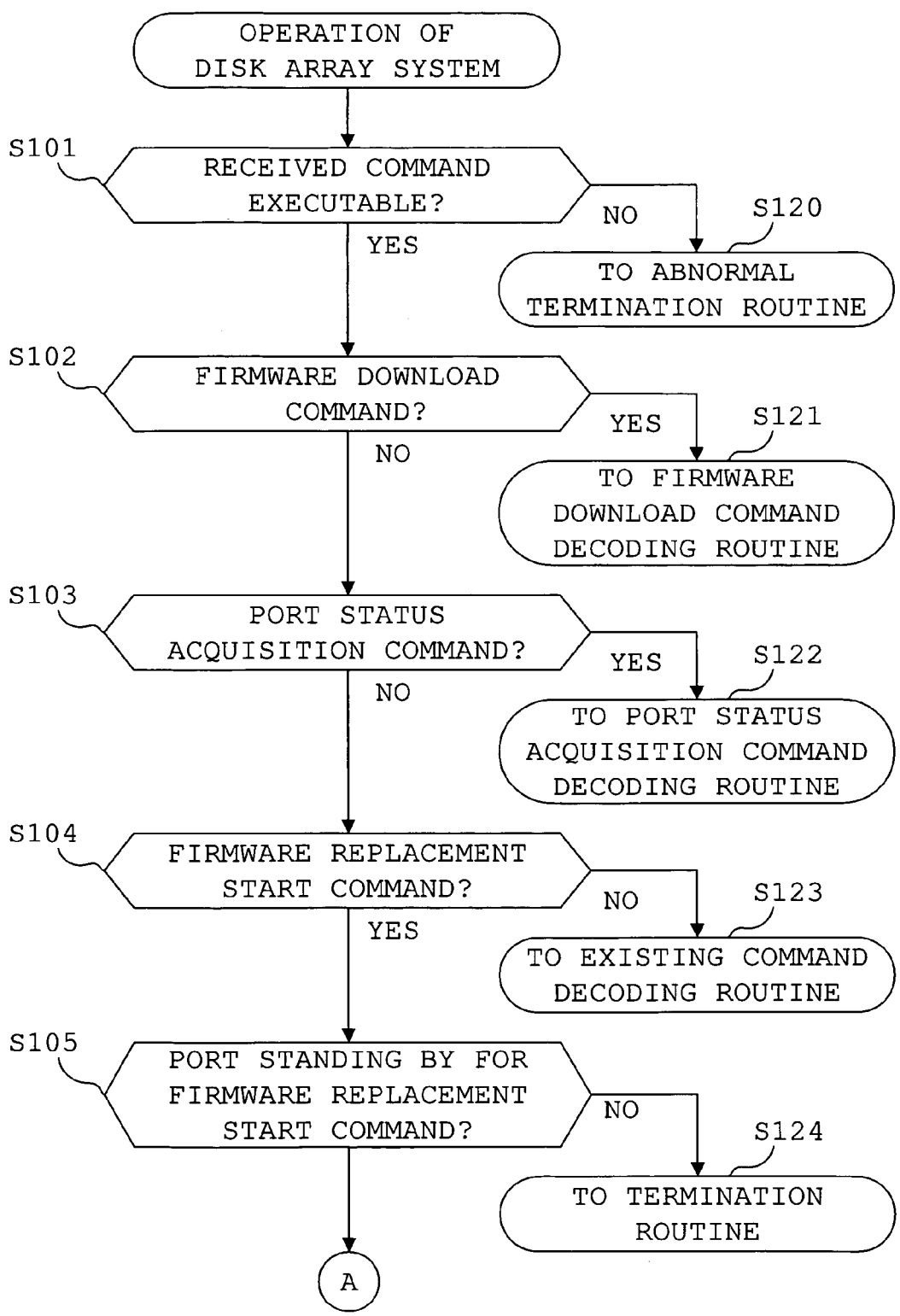
FIGS. 2A and 2B are flowcharts illustrating apart of a command routine executed by a controller.
Figure 2B:
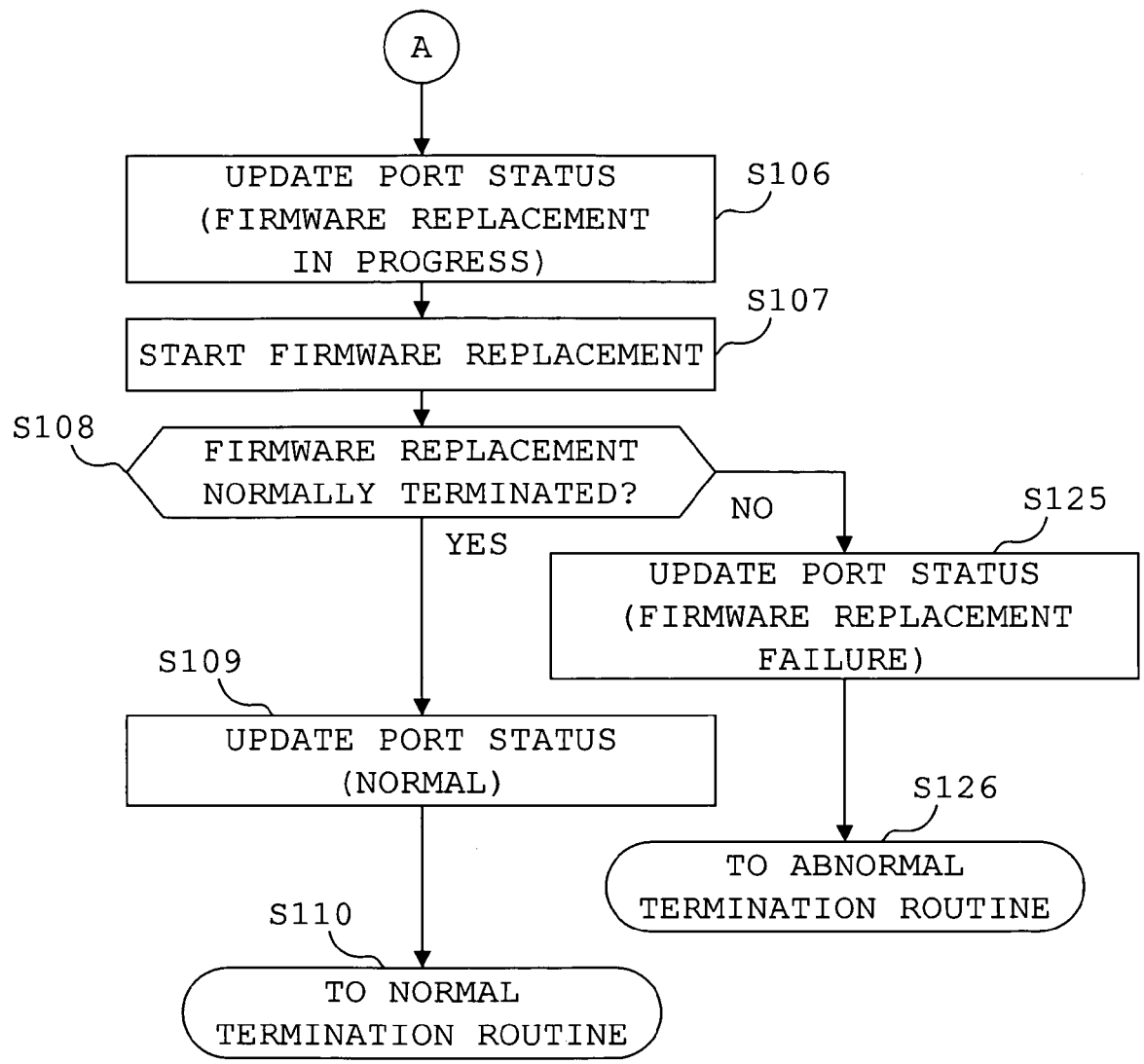

FIGS. 2A and 2B are flowcharts illustrating a part of a command routine executed by the controllers 11 and 12.

Figure 3:
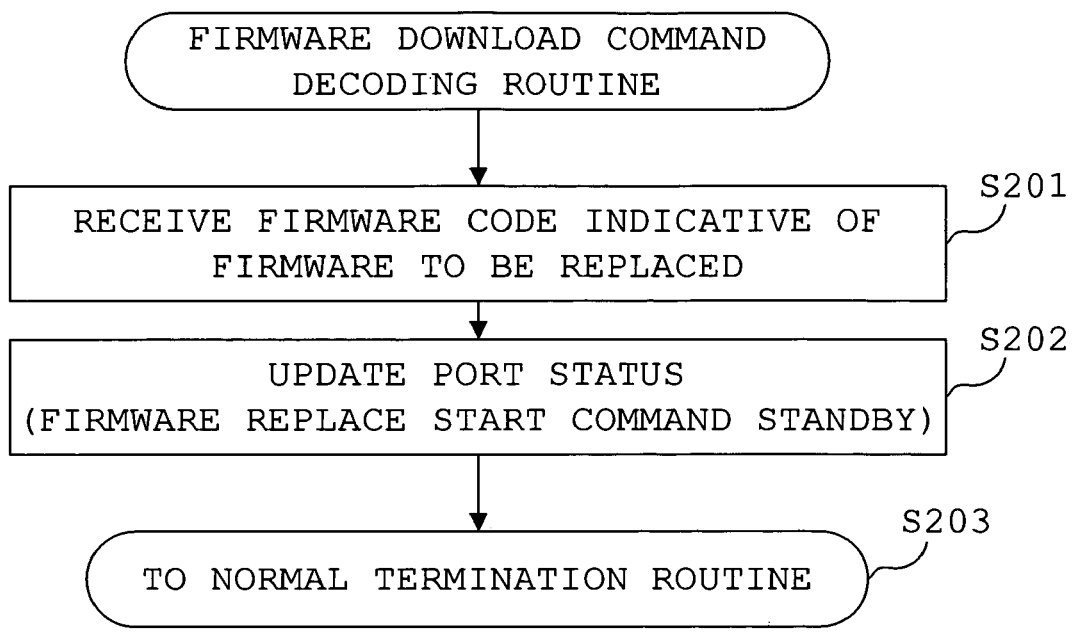
FIG. 3 is a flowchart illustrating a firmware download command decoding routine.

FIG. 3 is a flowchart illustrating a firmware download command decoding routine.

Figure 4:
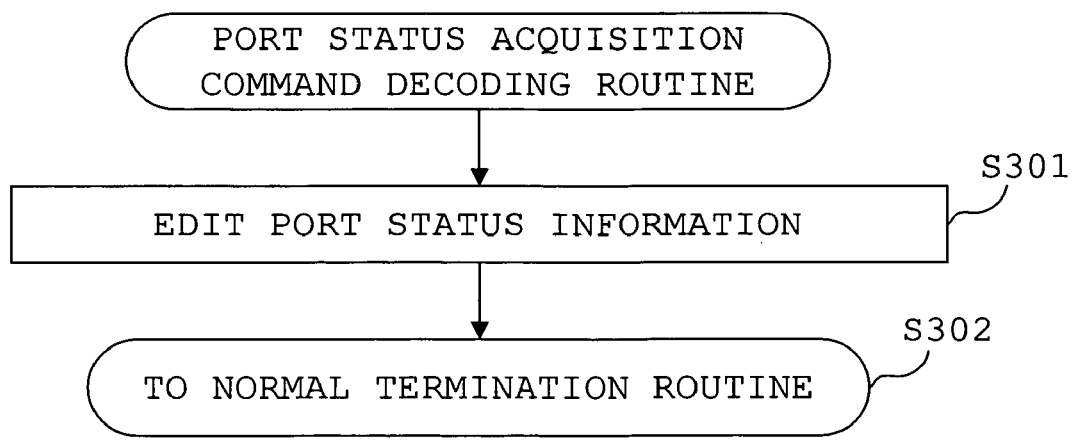
FIG. 4 is a flowchart illustrating a port status acquisition command decoding routine.

FIG. 4 is a flowchart illustrating a port status acquisition command decoding routine.

FIG. 5 is a diagram illustrating information given to the host computer 1 by the controllers 11 and 12.

Upon reception of a command from the host computer 1, the controllers 11 and 12 determine whether the command can be executed correctly or not (step S101). When the command cannot be executed correctly (step S101: NO), the flow goes to an abnormal termination routine (step S120). When the command can be executed correctly (step S101: YES), the controllers 11 and 12 determine whether the command is a firmware download command or not (step S102). When it is the firmware download command (step S102: YES), the flow goes to a firmware download command decoding routine (step S121), and goes to step S103 otherwise (step S102: NO).

When the flow goes to the firmware download command decoding routine from step S102 (step S121), as shown in FIG. 3, upon reception of a firmware code indicative of firmware to be replaced from the host computer 1 (step S201), the controller that stores the firmware sets information stored locally in such a way as to indicate the standby state for a firmware replacement start command (step S202) in order to present the status of the local port to the host computer 1, and then goes to the normal termination routine (step S203).

The controllers 11 and 12 store, the information to be presented to the host computer 1, port status information indicating the status of the port of each controller or the status of the path including that port in association with the number of the port and the World Wide Port Name given to the port as shown in FIG. 5 (t is to be noted that the controllers 11 and 12 acquire information on the statuses of their ports from each other by any method available).

At step S202, the controller 11 or 12 updates the port status information on each port. As the statues of the port, there are states of normal, firmware replacement in progress and firmware failure, in addition to the firmware replacement start command standby.

When the controller 11 or 12 downloads the firmware from an external maintenance control apparatus, the controller 11 or 12 first updates port status information, locally stored, on the controller where the firmware is to be written, to the status indicating the firmware replacement start command standby. It is to be noted that replacement of firmware does not take place and resumes a process according to the current firmware until the firmware replacement start command is received.

Subsequently, the controller 11 or 12 determines whether the command from the host computer 1 is a port status acquisition command or not (step S103). When it is the port status acquisition command (step S103: YES), the flow goes to a port status acquisition command decoding routine (step S122), and goes to step S104 otherwise (step S103: NO).

When the flow goes to the port status acquisition command decoding routine (step S122) at step S103, the controller edits the port status information, locally stored, in such a way as to correctly indicate the status of the port of each controller or the status of the path including that port (step S301), and goes to the normal termination routine (step S302).

At step S104, the controller 11 or 12 determines whether the command from the host computer 1 is the firmware replacement start command or not. When it is the firmware replacement start command (step S104: YES), the flow proceeds to step S105 and goes to an existing command decoding routine (step S123) otherwise (step S104: NO).

At step S105, the controller 11 or 12 determines whether the status of the local port 16 or 17 is standing by for the firmware replacement start command. When it is not the firmware replacement start command standby (step S105: NO), the flow goes to a termination routine (step S124). When it is the firmware replacement start command standby (step S105: YES), on the other hand, the controller 11 or 12 updates the port status information on the local port locally stored, in such a way as to indicate the status of the firmware replacement being in progress (step S106), and initiates the firmware replacement routine (step S107). As the status of a port to be targeted for maintenance work is updated to the firmware-replacement-in-progress status this way, the host computer 1 can recognize that the controller 11 or 12 is carrying out the maintenance work.

Next, the controller 11 or 12 determines the result of the routine (step S108). When it is the normal termination (step S108: YES), the controller 11 or 12 updates the port status information, locally stored, on the port which has undergone the firmware replacement routine, in such a way as to indicate the status of the normal status (step S109), and goes to the normal termination routine (step S110). When it is the abnormal termination (step S108: NO), the controller 11 or 12 updates the port status information, locally stored, in such a way as to indicate the status of a firmware replacement failure (step S125), and goes to the abnormal termination routine (step S126).

Next, the operation of the path redundancy driver 4 of the host computer 1 will be discussed referring to FIGS. 6A to 9.

Figure 6A:
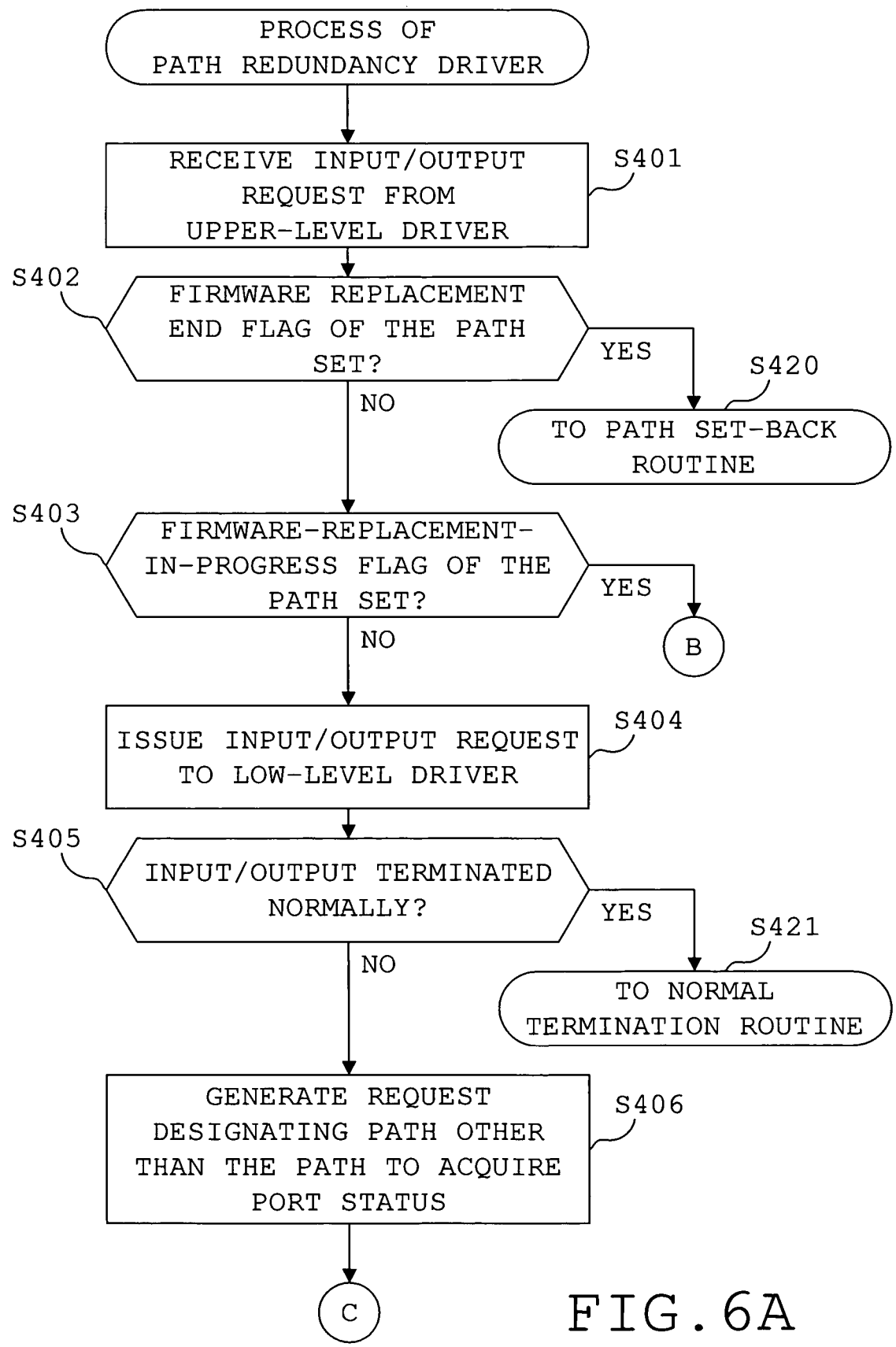
FIGS. 6A, 6B and 6C are flowcharts illustrating a part of the process of a routine that is executed by a path redundancy driver in FIG. 1.
Figure 6B:
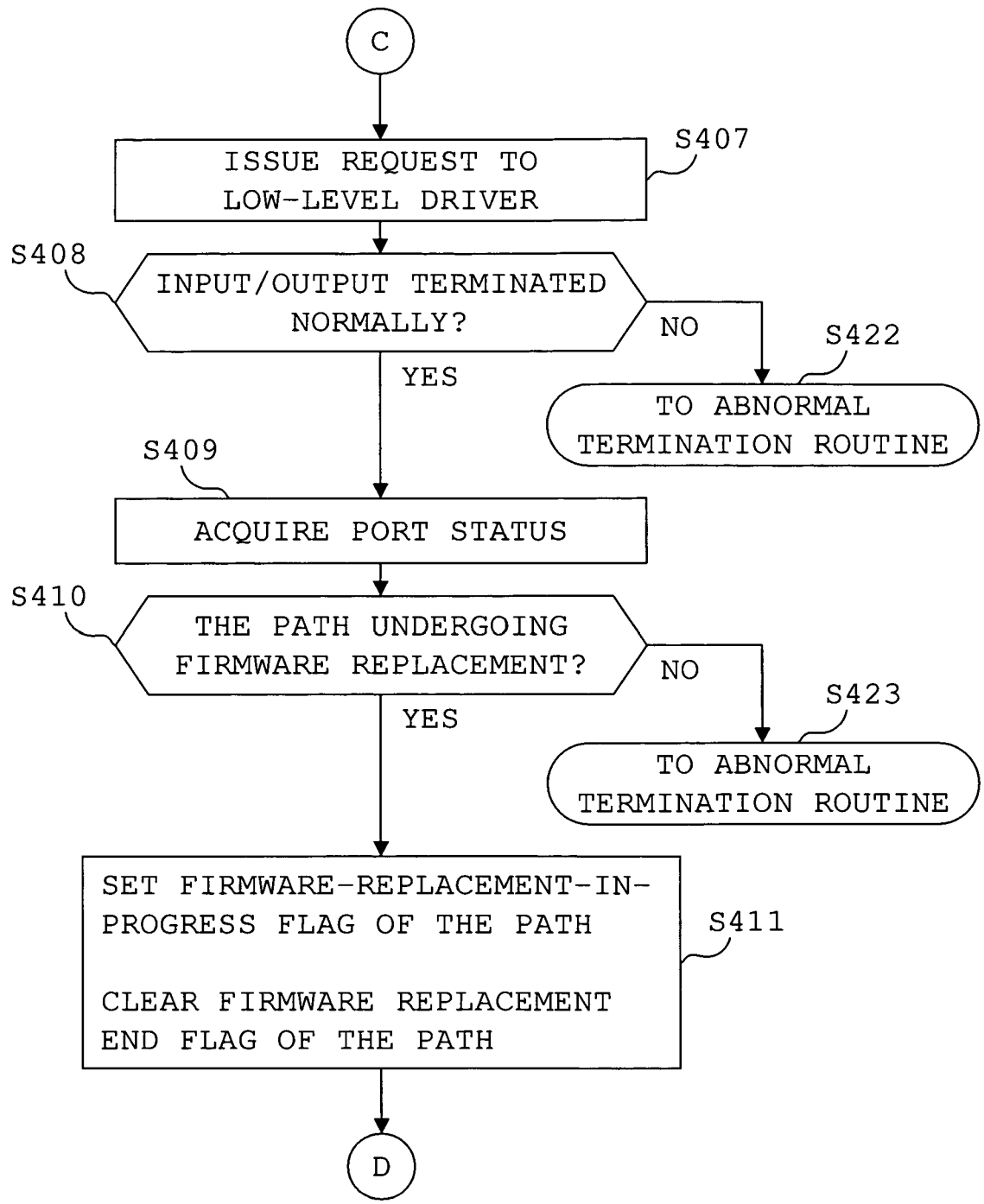
Figure 6C:
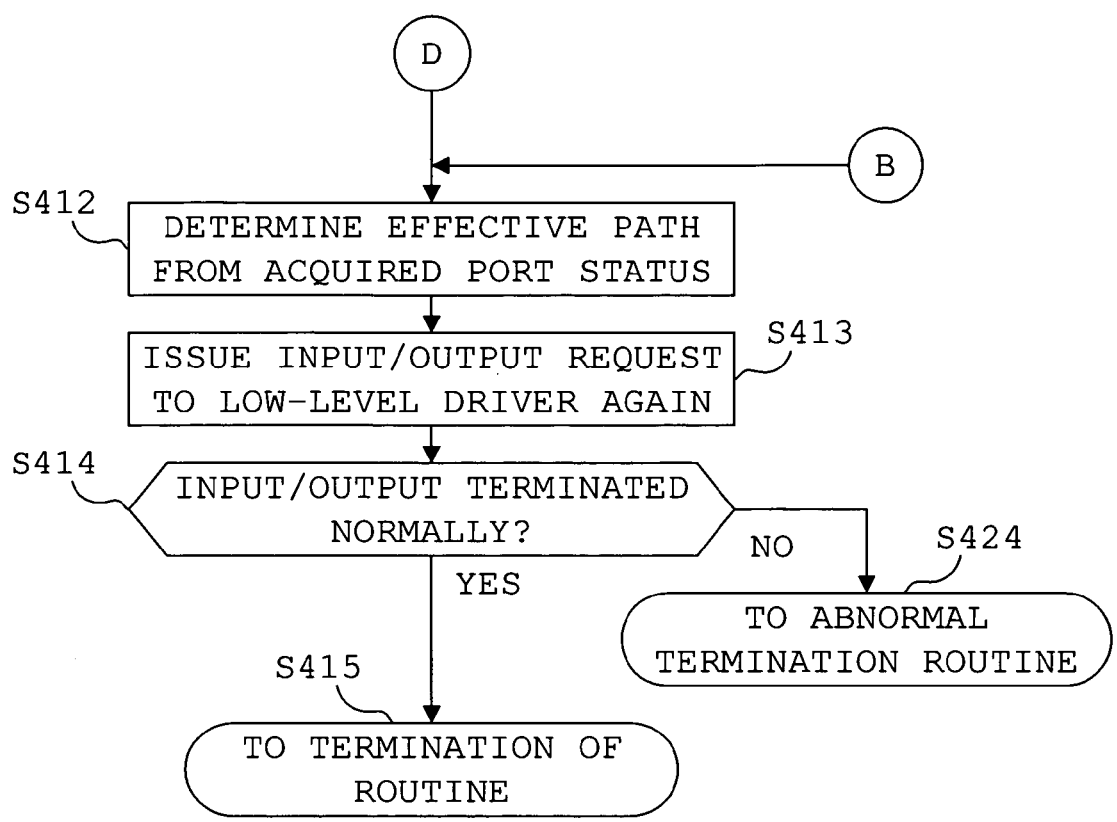

FIGS. 6A, 6B and 6C are flowcharts ills a part of the process of a routine that is executed by the path redundancy driver 4 in FIG. 1.

Figure 7:
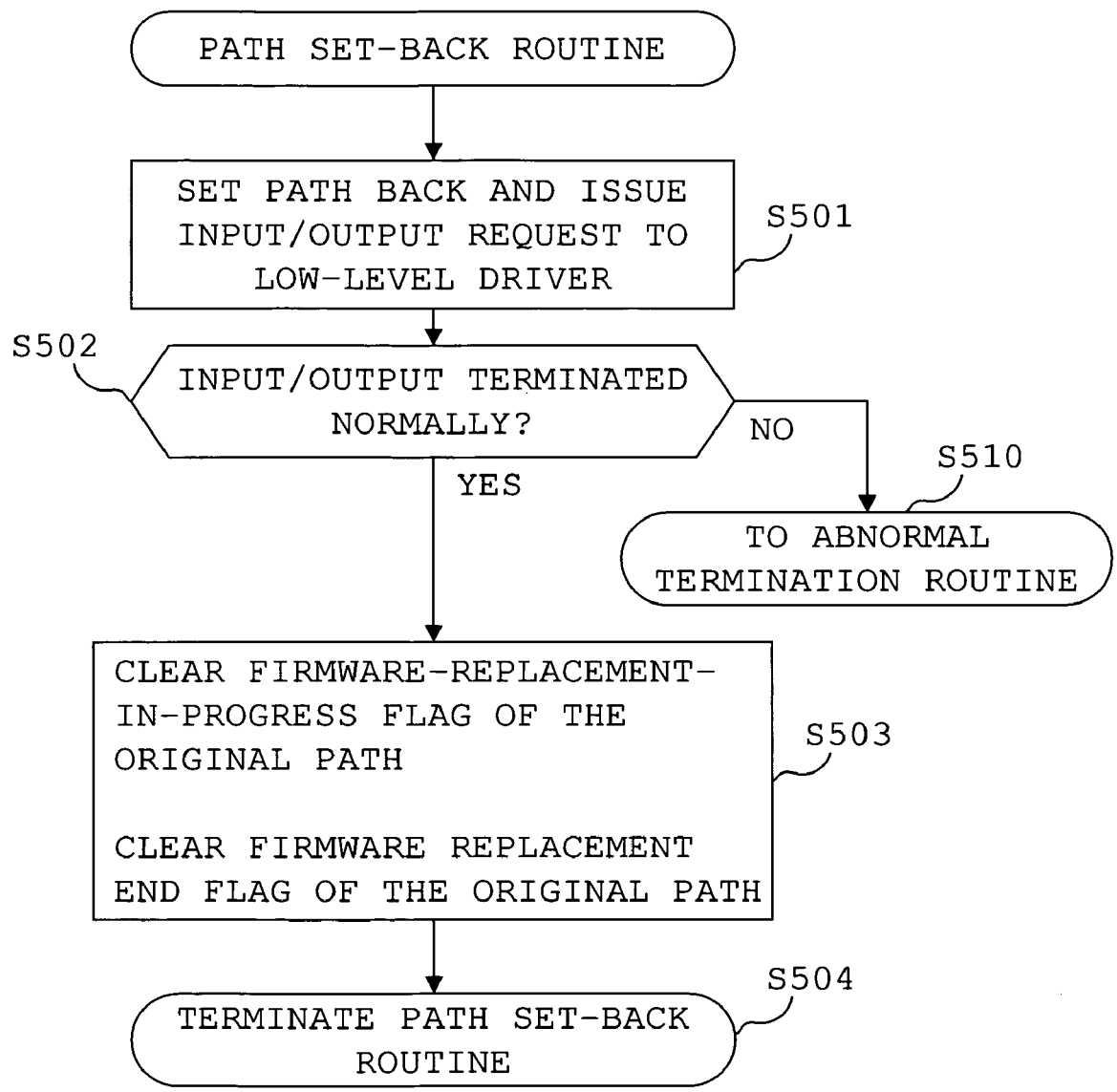
FIG. 7 is a flowchart illustrating a path set-back routine.

FIG. 7 is a flowchart illustrating a path set-back routine.

Figure 8A:
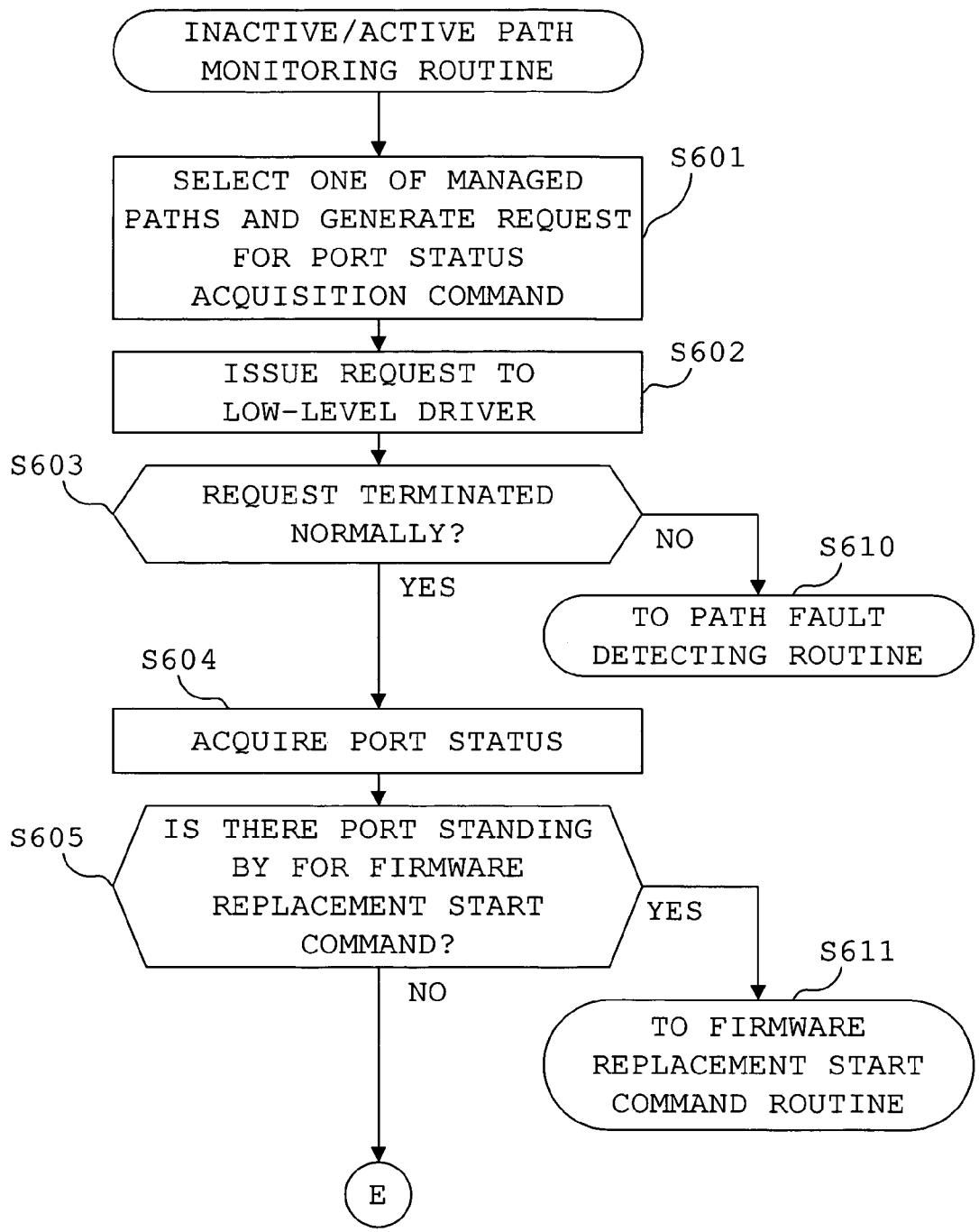
FIGS. 8A and 8B are flowcharts illustrating an inactive/active path monitoring routine.
Figure 8B:
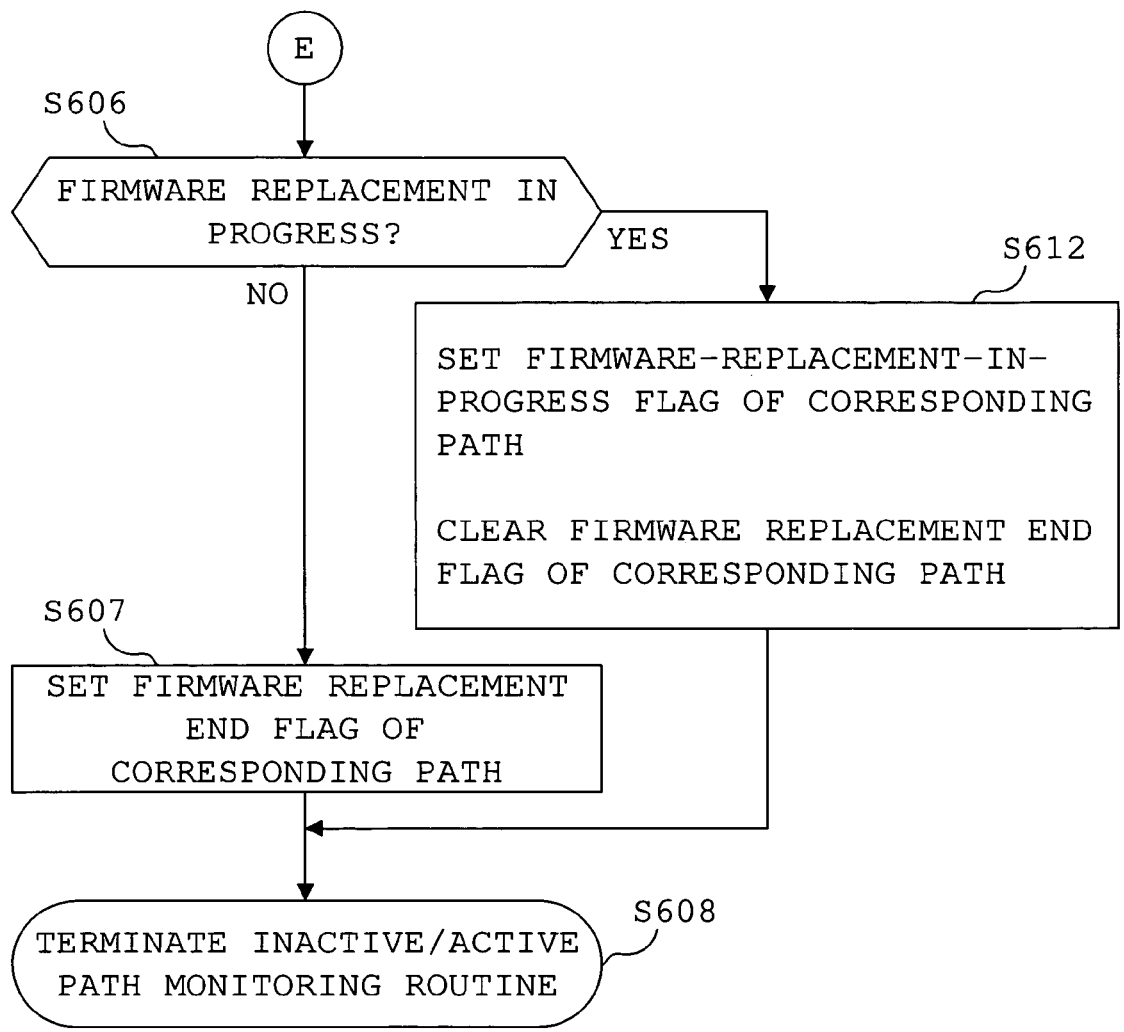

FIGS. 8A and 8B are flowcharts illustrating an inactive/active path monitoring routine.

Figure 9:
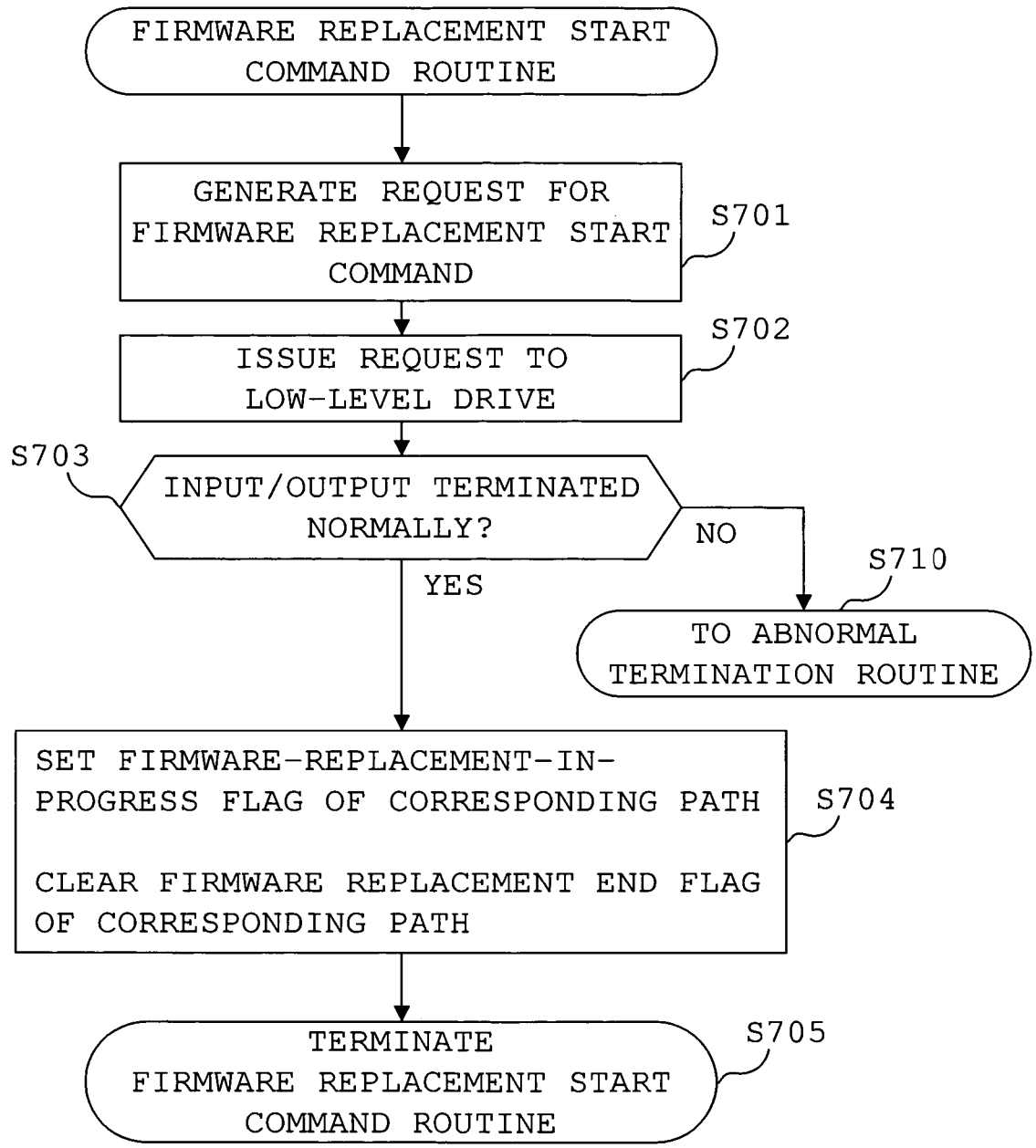
FIG. 9 is a flowchart illustrating a firmware replacement start command routine.

FIG. 9 is a flowchart illustrating the firmware replacement start command routine.

The path redundancy driver 4 executes the routines illustrated in FIGS. 6A to 9 using a firmware-replacement-in-progress flag and a firmware replacement end flag.

It is assumed that the path redundancy driver 4 stores the firmware-replacement-in-progress flag and the firmware replacement end flag for each portion of the disk array system 10, and clears the firmware-replacement-in-progress flag and the firmware replacement end flag at the time of initialization at which the path redundancy driver 4 is activated for the first time.

The path redundancy driver 4 receives a data input/output request for the disk array system 10 from the upper-level driver 3 (step S401). The request includes information which specifies the path for the data input/output.

The path redundancy driver 4 determines whether the firmware replacement end flag is set or not for the path to be used for the data input/output (step S402). When the flag is set (step S402: YES), the firmware replacement has already been finished so that the flow goes to the path set-back routine in FIG. 7 (step S420).

When the firmware replacement end flag is not set (step S402: NO), the path redundancy driver 4 determines whether the firmware-replacement-in-progress flag is set or not (step S403). When this flag is set (step S403: YES), the controller 11 or 12 in the path which will perform data input/output now on is doing firmware replacement, as will be discussed later, so that the path redundancy driver 4 skips to step S412. When the firmware replacement-in-progress flag is not set (step S403: NO), the path redundancy driver 4 issues a request for data input/output to the low-level driver 5 (step S404), and checks the result of executing the request (step S405).

When it is confirmed at step S405 that the normal termination has taken place (step S405: YES), the flow goes to the normal termination routine (step S421). When it is confirmed that the abnormal termination has taken place (step S405: NO), a fault might have occurred in the designated path or firmware replacement may be in progress. At step S406, therefore, to discriminate the cause for the abnormal termination that of the effective ports 16 and 17 managed by the path redundancy driver 4 which forms a path other than the one used at the time of the access having resulted in abnormal termination is designated, the port status acquisition command to acquire information of the status of the port is generated and is given to the low-level driver 5 (step S407).

Information acquired from the disk array system 10 as a result of the generation of the port status acquisition command is the information that has been edited at step S301 described earlier.

At step S408, the path redundancy driver 4 checks if the result of executing the command generated at step S407 has been normal. When it is abnormal termination (step S408: NO), which implies the occurrence of a fault in the path, the flow goes to the abnormal termination routine (step S422). When it is normal termination (step S408: YES), which implies that the port status information is properly supplied to the path redundancy driver 4, this information is acquired (step S409). Based on the port status information acquired at step S409, the path redundancy driver 4 determines whether the controller that has the port designated at step S407 is performing firmware replacement or not (step S410). When having decided that the controller is not performing firmware replacement (step S410: NO), the path redundancy driver 4 decides that the cause for the abnormal termination determined at step S405 is a temporary intermittent fault of the path, and goes to the abnormal termination routine (step S423).

When the path redundancy driver 4 decides that firmware replacement is in progress (step S410: YES), on the other hand, the path redundancy driver 4 sets the firmware-replacement-in-progress flag on the port to be discriminated, clears the firmware replacement end flag for the port (step S411), and shifts the flow to step S412.

At step S412, the path redundancy driver 4 decides the path to be used for retry, based on the port status information acquired at step S409 and the World Wide Port Name of the port in an effective path whose status is grasped by the path redundancy driver 4.

Next, the path redundancy driver 4 issues a data input/output request through the path decided at step S412 again to the low-level driver 5 (step S413). The issuance of the request here also serves as a retry process for the request that has been received from the upper-level driver 3 at step S401 and has been determined as abnormal termination.

The path redundancy driver 4 then checks the result of executing the data input/output whose request has been generated at step S413 (step S414). When the path redundancy driver 4 verifies normal termination (step S414: YES), it terminates the routine (step S415). In this case, the request that has been received from the upper-level driver 3 at step S401 and then has temporarily been determined as abnormal termination is sent to the disk array system 10 properly this time. As the path redundancy driver 4 decides at step S403 that firmware replacement is in progress, it skips to step S412 and the request for the data input/output that has been executed is terminated properly. Accordingly, the host computer 1 can continue the process according to the application software 8 even during firmware replacement. When the path redundancy driver 4 verifies abnormal termination (step S414: NO), on the other hand, the path redundancy driver 4 goes to the abnormal termination routine (step S424).

The path set-back routine at step S420 will now be described.

While the controller 11 or 12 is performing firmware replacement, the original path including the controller which is carrying out firmware replacement is not used, and another path is used for a data input/output access to the logical disk 13, 14 or 15 of the disk array system 10, as mentioned above. The path set-back routine in FIG. 7 sets a path to be used for an access back to the original path that had been used before firmware replacement was initiated.

The path redundancy driver 4 designates the original path indicated by the request received from the upper/level driver 3 at step S401, and generates a data input/output request via the low-level driver 5 (step S501).

Next, the path redundancy driver 4 checks if the result of executing the request is normal termination (step S502). When the path redundancy driver 4 verifies it as abnormal termination (step S502: NO), the path redundancy driver 4 goes to the abnormal termination routine (step S510). When the path redundancy driver 4 verifies it as normal termination (step S502: YES), the path redundancy driver 4 clears both the firmware-replacement-in-progress flag and the firmware replacement end flag for the original path (step S503), and terminates the path set-back routine (step S504).

The following will discuss the procedures of setting the firmware-replacement-in-progress flag and the firmware replacement end flag that are used at steps S402 and S403.

Even when a fault occurs in a path which has few data input/output traffic, this fault cannot be detected soon. To detect a fault promptly, the path redundancy driver 4 executes the inactive/active path monitoring routine shown in FIGS. 8A and 8B. The inactive/active path monitoring routine generates a command regularly (e.g., every minute), and determines whether there is a path fault or not, based on the result of executing the command. Any available method can be used to determine the timing of generating a command. For example, a clock signal for driving the processor of the host computer 1 may be acquired from an oscillator or so provided in the host computer 1 and the timing may be decided based on the clock signal.

In the inactive/active path monitoring routine, the path redundancy driver 4 selects one of plural paths whose statuses the driver 4 knows, generates a request for a command to acquire port status information for the port included in the path (step S601), and sends the request to the low-level driver 5 (step S602). Then, the path redundancy driver 4 checks the result of executing the request at step S603.

When the result of executing the request is abnormal termination (step S603: NO), which means that there is a fault in the path that has issued the request, the path redundancy driver 4 goes to a path fault detecting routine (step S610). When the request executing result is normal termination (step S603: YES), the path redundancy driver 4 acquires port status information (step S604), and discriminates whether or not there is a port which is standing by for initiation of firmware replacement (step S605).

When there is a port which is standing by for initiation of firmware replacement (step S605: YES), the flow goes to the firmware replacement start command routine (step S611). When there is no such port (step S605: NO), the path redundancy driver 4 discriminates whether or not there is a port which is undergoing firmware replacement at step S606.

When it is decided at step S606 that there is a port undergoing firmware replacement (step S606: YES), the path redundancy driver 4 sets the firmware-replacement-in-progress flag for the corresponding port and clears the firmware replacement end flag for the corresponding port (step S612), then terminates the inactive/active path monitoring routine (step S608). When there is no port undergoing firmware replacement (step S606: NO), the path redundancy driver 4 sets the firmware replacement end flag for the corresponding port (step S607), then terminates the inactive/active path monitoring routine (step S608).

The path redundancy driver 4 executes the firmware replacement start command routine at step S611, specifically, a sequence of processes at steps S701 to S710 shown in FIG. 9.

At step S701, the path redundancy driver 4 generates a request for the firmware replacement start command designating a controller having a port in the firmware replacement start command standby state (step S701), and sends the request to the low-level driver 5 (step S702). At step S703, the path redundancy driver 4 checks the result of executing the request issued at step S702.

When the result of executing the request is abnormal termination (step S703: NO), the path redundancy driver 4 goes to the abnormal termination routine (step S710). When the execution results is normal termination (step S703: YES), the path redundancy driver 4 sets the firmware-replacement-in-progress flag for the corresponding port and clears the firmware replacement end flag for the corresponding port (step S704), then terminates the firmware replacement start command routine (step S705).

Through the execution of the above-described processes, firmware is downloaded sequentially for those controllers which need firmware replacement in the disk array system 10. The firmware stored in the controllers in the disk array system 10 are changed without stopping the process that is executed by the host computer 1.

If those of the processes described above which are associated with downloading and replacement of firmware are changed to a process of replacing the package of the controller, the controller's package can be replaced without stopping the process that is executed by the host computer 1.

According to the embodiment, as described above, maintenance work on the disk array system 10 can be carried out without stopping data input/output based on the process that is executed by the host computer 1.

Further, the path redundancy driver 4 can discriminate whether the cause for a failure in data input/output request is a fault in a path (specifically, a fault in any one of the HBA, the host interface cable and the controller that constitute the path) or the controller becoming unresponsive during maintenance work. This eliminates the possibility that all faults would be treated as having originated from a fault in the path, so that troublesomeness at the time of doing maintenance work is avoided.

Further, a manual operation to switch the pats is unnecessary, and the path is changed with the cooperation of the disk array system with the path redundancy driver regardless of the number of host computers connected to the disk array system or the number of paths. This eliminates a risk of a miss-operation at the time of executing maintenance work.

The invention is not limited to the embodiment, but can be modified in various forms.

Figure 10:
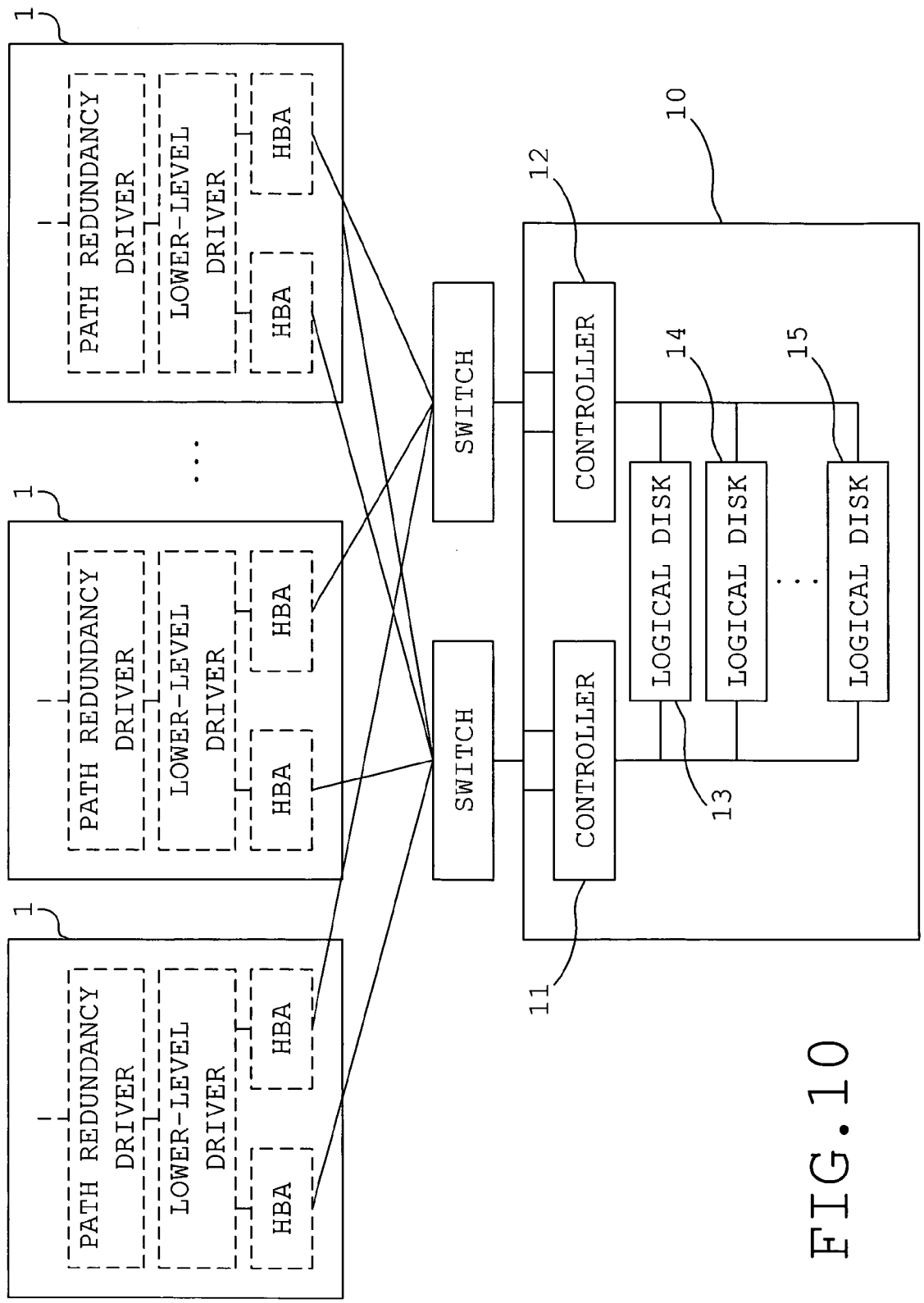
FIG. 10 is a diagram showing a modification of the apparatus in FIG. 1.

As shown in FIG. 10, for example, there may be plural host computers 1 which access the common disk array system 10.

The number of the HBAs provided in the host computer 1 is not limited to two. Although the host computer 1 has two HBAs 6 and 7 in the architecture shown in FIG. 1, the host computer 1 may include more HBAs as long as the architecture meets the restrictions of the specification of the operating system the host computer 1 is running, the specification of the low-level driver 5 and the hardware specification of the host computer 1, and the like.

Although the disk array system 10 has two controllers 11 and 12 in the architecture shown in FIG. 1, the number of the controllers of the disk array system 10 is not limited to two.

While the logical disks are constructed in the disk array system 10 in the architecture shown in FIG. 1, the logical disks may be constructed by external disks, such as JBOD (Just Bunch of Disks) connected to the disk array system 10.

The number of the disk array systems 10 to be connected to the host computer 1, the number of the logical disks constructed in the disk army system 10 and the number of the internal buses in the disk array system 10 can take arbitrary values.

The statuses of a port that can be expressed by port status information need not be limited to four kinds, namely, normal, firmware replacement start command standby, firmware replacement in progress and failure in firmware replacement, but may be classified according to arbitrary criterion.

The source for firmware that is acquired by the controller 11 or 12 is arbitrary. Therefore, firmware may be downloaded via a communication circuit or the like from a maintenance center or so at a remote location.

According to the invention, as described above, the host computer can use logical disks without stopping the process the host computer executes. As each controller stores information indicative of the statuses of ports, even when the host computer fails an access to a logical disk, the cause for the access failure can be discriminated based on the information.

Various embodiments and changes may be made thereunto without departing from the broad spirit and the scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-30871 filed on Feb. 6, 2004 and including specification, claims, drawings and summary. The disclosure of the above Japanese Patent Application is incorporated herein by reference in its entirety.

What is claimed is:

1. A redundant path control system comprising:
   a host computer; and a plurality of controllers connected to said host computer and an external memory device and mediates accesses of said host computer to said memory device through communication with said host computer, routes from said host computer to said controllers forming a plurality of paths different from one another, wherein each of said controllers acquires status information indicative of a status of a path including other controllers, stores said status information, and supplies said host computer with said status information in response to a request sent from said host computer, and said host computer designates one of said plurality of paths based on said status information and accesses said memory device via said designated path, wherein said status information includes information indicating a controller targeted for maintenance work.

2. The redundant path control system according to claim 1, wherein when an access to said memory device has failed, said host computer supplies said request to that controller which forms a path other than a path used for said access, and acquires said status information from said controller, determines based on said acquired status information whether or not failure of said access has occurred because that controller which forms said path used for said access has been a target for maintenance work, and designates a path different from said path used for said access and accesses said memory device via said designated path upon determination that failure of said access has occurred because that controller which forms said path used for said access has been a target for maintenance work.

3. The redundant path control system according to claim 1, wherein said host computer periodically specifies a controller targeted for maintenance work based on said status information acquired by periodically supplying said request to an arbitrary one of said controllers.

4. The redundant path control system according to claim 1, wherein said system includes a plurality of host computers.

5. The system of claim 4, wherein each of the plurality of hosts is configured to utilize status information to issue a firmware replacement start command to any of the controllers and obtain the result of a firmware update.

6. A redundant path control method for allowing a host computer to select a path to be used for an access to an external memory device in a system comprising said host computer, and a plurality of controllers connected to said host computer and said external memory device and mediates accesses of said host computer to said memory device through communication with said host computer, routes from said host computer to said controllers forming a plurality of paths different from one another, wherein each of said controllers acquires status information indicative of a status of a path including other controllers, stores said status information, and supplies said host computer with said status information in response to a request sent from said host computer, and said host computer designates one of said plurality of paths based on said status information and accesses said memory device via said designated path, wherein said status information includes information indicating a controller targeted for maintenance work.

\* \* \* \* \*